United States Patent Office 3,135,711
Patented June 2, 1964

3,135,711
POLYURETHANE COATING COMPOSITION CONTAINING ISOCYANURIC ACID RINGS
Wilhelm Thoma, Leichlingen, and Otto Bayer and Heinrich Rinke, Leverkusen, Germany, assignors to Farbenfabriken Bayer Aktiengesellschaft, Leverkusen, Germany, a corporation of Germany
No Drawing. Filed Apr. 21, 1960, Ser. No. 23,651
Claims priority, application Germany Apr. 25, 1959
6 Claims. (Cl. 260—39.4)

This invention relates to coating compositions and more particularly to polyurethane coating compositions and a process for the preparation thereof.

It has been proposed heretofore to prepare polyurethane coating compositions by the reaction of an organic polyisocyanate with polyhydroxy compounds such as, for example, hydroxyl polyesters. In this process the organic polyisocyanate is reacted with a polyhydroxy compound and a cross-linking agent such as 1,4-butane diol to prepare an elastomeric product. These elastomeric products have been dissolved heretofore in dimethyl formamide at elevated temperatures. The dissolution of the elastomer takes place because of the effect of dimethyl formamide on cross-linking bonds in the elastomer and can be promoted by the presence of small quantities of organic bases. Consequently, the dimethyl formamide solutions of polyurethane elastomers contain degraded products. Moreover, the dissolution cannot be controlled effectively so that reproduceable products for the preparation of coating solutions can be obtained.

It is known to employ these heretofore known solutions in conjunction with a cross-linking agent which has been painted onto a support to prepare polyurethane coatings. Also, coating compositions have been prepared by applying a polyurethane prepolymer having terminal hydroxyl groups to a support and then spraying the support with an organic polyisocyanate. Furthermore, the polyhydroxy compound can be mixed with an organic polyisocyanate and then immediately applied to a support to obtain polyurethane coatings. The disadvantage with these processes is they involve the use of two component systems which require additional operating steps in the application of a coating.

It is, therefore, an object of this invention to provide an improved polyurethane coating composition, a process for its preparation and a method of coating substrates. Another object of this invention is to provide improved solvents for the preparation of polurethane plastics in solution. Still another of this invention is to provide improved polyurethane coating compositions which are storage stable. A further object of this invention is to provide an improved process for the preparation of storage stable polyurethane coating compositions. Still another object of this invention is to provide an organic solvent solution of a polyurethane plastic which may be used for a coating composition. A further object of this invention is to provide as improved coating composition for textiles and an improved process therefor.

The foregoing objects and others are accomplished in accordance with the invention, generally speaking, by providing a coating composition obtained by reacting an excess of an organic polyisocyanate with an organic compound containing at least two active hydrogen containing groups as determined by the Zerewitinoff method in a first step to obtain a prepolymer having terminal isocyanate groups and subsequently reacting said prepolymer with a polyhydric alcohol or polyamine in an inert organic solvent and in the presence of a catalyst which will cause polymerization of —NCO groups to form isocyanuric acid rings until the viscosity of the reaction mixture is within the range of from about 10 to about 2000 poises at 30° C., and thereafter combining the reaction mixture of the first step with a monohydric alcohol or mono-primary amine and continuing the reaction until there are substantially no free —NCO groups remaining in the mixture. The resulting product is then a viscous solution which may be applied to various substrates and allowed to cure by solvent evaporation to form a polyurethane coating. The invention, therefore, contemplates the reaction of an isocyanato-terminated prepolymer in an inert organic solvent which does not react with —NCO with a polyhydric alcohol or polyamine in the present of a catalyst which will cause polymerization of —NCO groups to form isocyanuric acid rings in a first stage and subsequently with a monohydric alcohol or monoamine to stop the cross-linking reaction. An improved cross-linked polyurethane coating or impregnating material in solution is obtained which may be applied directly to a support and cured by evaporation of the solvent. One essential feature of the invention, therefore, is the provision of a completely reacted and cross-linked coating or impregnating material in solution.

The first stage of the process of the invention is conducted in the usual manner by reacting an excess of an organic polyisocyanate with an organic compound containing at least two active hydrogen containing groups as determined by the Zerewitinoff method. It is preferred to use organic diisocyanates and organic compounds two active hydrogen containing groups in such proportions that from about 140 to about 340 parts by weight of —NCO groups are present in the diisocyanate for each 34 parts of active hydrogen containing groups such as hydroxyl groups in the active hydrogen containing compound. The reaction between the organic polyisocyanate and the organic compound containing at least two active hydrogen containing groups to prepare an isocyanato-terminated prepolymer is preferably carried out at the temperature within the range of about 80° C. to about 150° C., the most preferred temperature range being from about 100° C. to about 130° C.

Any suitable organic compound containing at least two active hydrogen containing groups as determined by the Zerewitinoff method may be used in the first stage of the reaction leading to the coating composition of the present invention. The preferred class of compounds are those which have a molecular weight of from about 500 to about 3000, an hydroxyl number below about 600, acid numbers below about 5 and most preferably contain terminal hydroxyl groups. Suitable compounds are, for example, hydroxyl terminated polyesters and polyalkylene ether polyalcohols containing ether bridges which may be either oxygen ether bridges or sulfur ether bridges or mixtures thereof. Therefore, the preferred type of organic compound containing at least two active hydrogen containing groups are hydroxyl polyesters obtained from polycarboxylic acids and polyhydric alcohols as well as the reaction products thereof with isocyanates to prepare polyester urethanes and reaction products thereof in which are included some amines such as ethylene diamine or ethanol amine to prepare polyester amides, polyhydric polyalkylene ethers and polyhydric polythioethers such as are obtained from the condensation of alkylene oxides either alone or in conjunction with polyhydric alcohols or the condensation of alkylene oxides with thioether glycols, respectively, and mixed polyester polyethers having terminal hydroxyl groups. In the preparation of the hydroxyl polyesters, suitable polycarboxylic acids include, for example, adipic acid, suberic acid, sebacic acid, phthalic acid, terephthalic acid, thiodiglycollic acid, aspartic acid, brassylic acid and the like. Polyhydric alcohols which may be used in the preparation of either the polyesters or polyethers set forth above include, for example, ethylene glycol, 1,3-propylene glycol, 1,4-butane diol, 1,6-hexane diol, bis-hydroxy methyl cyclohexane, trimethylol propane, pentaerythritol, sorbitol and the like. Where polyester amides are desired, diol diamides such as adipic acid-diethanol amide, terephthalic acid-bis-propanol amide and the like may also be used in combination with the above-defined polycarboxylic acids. Urethane groups can be incorporated into the polyester by reacting the polyester with a small amount of an organic diisocyanate such as 4,4'-diphenylmethane diisocyanate, 2,4- or 2,6-toluylene diisocyanate as well as mixtures thereof, 1,6-hexamethylene diisocyanate and the like. Polyesterpolyethers may be obtained by reacting diethylene glycol, triethylene glycol, 1,4-phenylene-bis-hydroxy ethyl ether, 1,2-diphenyl propane-4,4'-bis-hydroxy ethyl ether or the like with the above-described polycarboxylic acids. The polyethers having oxygen ether bridges may be obtained from any suitable alkylene oxide such as, for example, ethylene oxide, 1,2-propylene oxide, 1,2-butylene oxide, tetrahydrofuran and the like. Where sulfur ether bridges are desired, one may condense thiodiglycol either alone or in combination with one or more of the polyhydric alcohols set forth above for the preparation of polyesters.

Any suitable organic polyisocyanate may be used including aliphatic, aromatic and heterocyclic polyisocyanates. Organic diisocyanates of this type are preferably employed. Therefore, in addition to the organic polyisocyanates set forth above for use in the preparation of the polyester urethanes, one may employ 1,5-naphthylene diisocyanate, p,p',p''-triphenylmethane triisocyanate, ethylene diisocyanate, 1,4-cyclohexylene diisocyanate, 1-chlorophenyl 2,4-diisocyanate, p-phenylene diisocyanate, furfurylidene diisocyanate and the like.

The second stage of the reaction is carried out in the presence of an inert organic solvent and involves the reaction of the isocyanato-terminated prepolymer of the first step with an insufficient quantity of either a polyhydric alcohol or a polyamine to react with all of the free —NCO groups. Any suitable solvent which will not react with the free —NCO groups in the reaction mixture may be used at this stage of the reaction. Suitable solvents are, for example, methylethylketone, diethylketone, methylpropylketone, dipropylketone, methylisobutylketone, butyl acetate, dipropyl ether, dioxane, tetrahydrofuran chlorobenzenes dichlorobenzene and the like. The heretofore known dimethyl formamide or dimethyl acetamide solvents are to be avoided at this stage in the reaction since the reaction in these solvents cannot lead to the desired high molecular weight cross-linked polyurethane coating compositions of the invention. In these heretofore known solvents a vast percentage of the free —NCO groups are taken up by reaction with the dimethyl formamide or dimethyl acetamide solvent, splitting out carbon dioxide. The time in hours for five grams of 4,4'-diphenylmethane diisocyanate to react in 200 millimeters of dimethyl formamide to the extent that the isocyanate concentration is reduced to zero is shown in the following table.

Table 1

| Time (hours) | Isocyanate Concentration in percent of initial value |
| --- | --- |
| 0 | 100 |
| 0.5 | 50 |
| 1 | 35 |
| 2 | 10 |
| 3 | 0 |

During this second stage of the reaction leading to the coating composition of the invention, the isocyanato-terminated prepolymer reacts with the polyhydric alcohol or polyamine to form urethane groups or urea groups, respectively, and the free —NCO groups remaining form allophanate or biuret linkages and, in addition, react with other free —NCO groups to form isocyanuric acid rings. In order to promote the reaction of free —NCO groups in the reaction mixture with themselves to form isocyanuric acid rings, a catalyst which promotes this reaction is included in the reaction mixture. Any suitable catalyst which will cause the reaction of an isocyanate group with two others to form an isocyanuric acid ring may be used, such as, for example, tertiary amines including dimethyl cyclohexylamine, dimethyl aniline, hexahydrodimethyl aniline, methyl morpholine, ethyl morpholine, permethylated diethylene triamine, triethylene tetramine and the like; alkali alcoholates, such as sodium ethylate, sodium propylate and the like; alkali phenates such as sodium phenate, potassium phenate and the like; salts of organic acids such as, for example, sodium carbonate, sodium formate, sodium benzoate and the like; heavy metal compounds which are soluble in organic solvents such as iron acetylacetonate and the like tri-N-butyl phosphine and the like. Catalytic amounts of the catalyst are preferred. Generally speaking, from about 0.001 percent to about 5 percent by weight of the catalyst based on the weight of the reaction mixture is most preferred.

The second stage of the reaction is continued until the viscosity of the reaction mixture reaches a value between about 10 and about 2,000 poises at 30° C. and at this stage the cross-linking reactions are terminated by adding monomeric monohydric alcohols or monomeric monoamines to react with any free —NCO groups remaining. Any suitable monomeric monohydric alcohol and/or monomeric primary monoamine may be used to terminate the cross-linking reactions such as, for example, aniline, ethanolamine, diisobutylamine, N-methyl aniline, ethanol propanol, butanol and the like. If an excess of the monomeric monoamine component is used, it may be necessary to neutralize the reaction mixture with a suitable acid such as a lower pyrocarbonic acid or acid ester. This last stage of the reaction wherein the reaction product of the isocyanato-terminated prepolymer and the polyhydric alcohol or polyamine is combined with a monohydric alcohol or monoamine may be carried out in an additional quantity of organic solvent which may be those inert organic solvents set forth above that do not react with isocyanate groups or even the dimethyl formamide or diemethyl acetamide solvents which do react with isocyanates. This third stage of the reaction is continued until there are substantially no free —NCO groups remaining. Then the organic solvent solution of the polyurethane is suitable for application directly to a substrate including textiles such as cotton, nylon, rayon and the like, wood, metal, such as iron, aluminum, copper, steel and the like and other building materials including concrete and the like.

The process of the invention is most advantageously carried out by combining an inert organic solvent solution of the isocyanate-terminated prepolymer with an inert organic solvent solution of the polyhydric alcohol or polyamine which also contains the catalyst which will cause the isocyanate groups to react with each other to form isocyanuric acid rings. The reaction of the isocyanato-terminated prepolymer with the polyhydric alcohol or polyamine is preferably carried out at a temperature within the range of from about 70° C. to about 130° C., the most preferred temperature range being from about 80° C. to about 100° C. The reaction product obtained in the second stage is a highly viscous solution which can then be mixed with an organic solvent that does not need to be neutral with respect to —NCO groups and then the cross-linking reactions can be stopped by the addition of the monomeric monohydric alcohol or monoamine to obtain a coating composition. It is advantageous in this last stage of the reaction leading to the formation of the coating composition of the invention to adjust the solids content to between about 20 percent and about 50 percent by weight. Suitable solvents for this last stage, in addition to those set forth above which are inert with respect to —NCO groups, are dimethyl formamide, dimethyl acetamide, dimethyl sulfoxide and the like. Even non-volatile solvents can be used which remain in the coating composition and act as plasticizers and in this case the solid content can be far more than 50 percent by weight. These auxiliary solvents must be soluble in water and are, for example, water-soluble polyethylene oxides which are etherified or esterified at the terminal groups by reaction with a monohydric alcohol or a monocarboxylic acid such as, for example, methanol, ethanol and the like or benzoic acid, acetic acid and the like.

The coating compositions of the invention can, of course, include color pigments and fillers such as, for example, titanium dioxide, talc and the like, and can have incorporated therein spirit-soluble or fat-soluble dyestuffs.

The coating composition of the invention may be applied in any suitable manner, for example, by means of a doctor blade, by rolling, dipping, spraying, impregnating, rinsing and the like. After the coating composition is applied the solvent is allowed to evaporate at atmospheric pressures and temperature or, in the alternative, it is heated for a short time to an elevated temperature of about 60° C. to about 150° C., the most preferred heating temperature being within the range of from about 80° C. to about 130° C. The heating is continued until the solvent has substantially evaporated and a solidified coating is obtained. If a textile, such as a thread or web is coated with the coating composition of the invention it may be wound by passing it over a cooling roller immediately after solidification of the coating composition. If the solvents used in the reaction are those which can be emulsified with water, the resulting coating composition can also be applied as an emulsion. In either event, whether the resulting coating composition is a solution or an emulsion, in a preferred embodiment of the invention, three-dimensional irregular fibers of wool, cotton, nylon, rayon, cellulose and the like are coated by dipping saturating, rinsing or spraying to obtain a non-woven fabric.

It was not to be expected that the degree of branching and cross-linking obtained in accordance with this invention could be obtained in solution and that the poly-condensation products could be applied to substrates by evaporation of the solvent. The coating compositions of the invention yield coatings which have been mechanical properties such as high elongation, resistance to breaking or bending and resistance to abrasion. The coatings obtained have a good hand and are resistant to water, alkalis and solvents such as benzine and perchloroethylene. Therefore, the coatings of the invention are particularly useful for the preparation of rain-proof clothing, tarpaulins, packing materials, linings to water-proof containers and the like.

The invention is further illustrated by the following examples in which the parts are by weight unless otherwise indicated.

*Example 1*

About 300 grams of a polyester (—OH number about 56) produced from ethylene glycol and adipic acid are dehydrated in vacuo and reacted with about 120 grams of 4,4'-diphenylmethane diisocyanate at about 130° C. (reaction period about 1 hour). The melt containing —NCO groups is dissolved in about 150 grams of dry methylethylketone and a solution of about 27.0 grams of butane-1,4-diol and about 1.2 cc. of dimethyl cyclohexylamine in about 111.5 grams of methylethylketone are added at about 80° C. The reaction solution is kept for about 20 minutes at about 80° C., about 262.5 grams of dimethyl formamide heated to about 80° C. are then added and thereafter approximately another 75 grams of methylethylketone at room temperature, to which about 3 ml. of diisobutylamine have been added. The excess monoamine is reacted with about 2 ml. of pyrocarbonic acid diethyl ester.

About 700 grams of the solution which is obtained are ground with about 160 grams of kaolin, about 20 grams of titanium dioxide and about 20 grams of an organic pigment dyestuff and approximately another 100 grams of methylethylketone on a single roll color mill and applied with a doctor blade to a web of cotton fabric. For evaporating the solvent, the coated web is conveyed through a drying chamber at a temperature of about 80° C.

For judging the storability of the solution, this is applied once again after being kept for about 8 weeks at about 30° C.; the same textile properties are observed.

*Example 2*

About 100 grams of the polyester described in Example 1 are reacted at about 130° C. with about 18.0 grams of 1,5-naphthylene diisocyanate (reaction period about 25 minutes). The melt is dissolved in about 50 grams of methylethylketone and a solution of about 2.0 grams of 1,4-butane diol and about 0.1 cc. of dimethylcyclohexylamine in about 35 grams of methylethylketone is added. After about 25 minutes, about 155 grams of dimethyl formamide or about 55 grams of dimethyl formamide and about 100 grams of methylethylketone, these solvents containing about 1.5 ml. of N-methyl aniline are added. After incorporating a pigment in accordance with Example 1, the solution is applied to the support.

*Example 3*

About 100 grams of a poly-1,4-butylene ether (—OH number about 43) are dehydrated in vacuo and then reacted with about 30.8 grams of 4,4'-diphenylmethane diisocyanate at about 130° C. The melt is dissolved in about 100 grams of methylethylketone and a solution of about 6.70 grams of butane-1,4-diol, about 0.20 gram of trimethylol propane and about 0.4 cc. of dimethyl cyclohexylamine in about 50 grams of methylethylketone is added. The reaction solution is kept for about 2 hours at about 80° C., about 1.0 cc. of diisobutylamine is added for terminating the reaction and the solution is thereafter diluted with about 260 grams of dimethyl formamide, to which about 1.0 cc. of pyrocarbonic acid diethyl ester has been added. Pigments are added to the brushing solution in accordance with Example 1 and the solution is then applied.

*Example 4*

About 100 grams of a polythioether (—OH number about 110) which has been obtained by polycondensation of thiodiglycol, is allowed to react for about 15 minutes at about 130° C. with about 78 grams of 4,4'-diphenylmethane diisocyanate. The melt is dissolved in about 75 grams of methylethylketone and a solution of about 17.6 grams of butane-1,4-diol and about 0.4 cc. of dimethyl cyclohexylamine in about 50 grams of methylethylketone is added. The reaction mixture is kept for about 15 minutes at about 80° C. and the viscous solution is diluted with about 100 grams of dimethyl formamide and about 70 grams of methylethylketone, the latter having added thereto about 1 ml. of ethanolamine. In order to react excess ethanolamine, about 1 ml. of pyrocarbonic acid diethyl ester is added to the solution. The solution is applied in accordance with Example 1.

*Example 5*

About 100 grams of the polythioether described in Example 4 are heated with about 12.3 grams of 4,4'-diphenylmethane diisocyanate for about 10 minutes to about 90° C. The polycondensate containing —OH groups is further reacted with about 39.3 grams of the same diisocyanate at about 130° C. The operative period is about 15 minutes. The melt is taken up in about 50 grams of methylethylketone and there is added thereto a solution of about 8.9 grams of butane-1,4-diol in about 50 grams of methylethylketone together with about 0.4 cc. of dimethyl cyclohexylamine. After a reaction period lasting about 10 minutes at about 80° C., the solution is diluted with about 100 grams of dimethyl formamide and about 40 grams of diethylketone; the latter contains about 1 ml. of diisobutylamine. The further procedure is in accordance with Example 1.

Example 6

About 100 grams of the polyester described in Example 1 are reacted with about 40 grams of 4,4'-diphenylmethane diisocyanate at about 130° C. The melt is taken up in about 50 grams of dry n-butylacetate and there is added thereto a solution of about 9.0 grams of butane-1,4-diol and about 0.4 cc. of dimethyl cyclohexylamine in about 50 grams of n-butylacetate. The mixture is allowed to react for about 20 minutes at about 80° C. and there are then added about 50 grams of dimethyl formamide containing about 1 ml. of diisobutylamine. The viscous brushing solution is applied to the support in accordance with Example 1.

Example 7

About 100 grams of a polyester of diethylene glycol and adipic acid (—OH number about 56) are reacted at about 130° C. with about 38 grams of 4,4'-diphenylmethane diisocyanate. After a reaction period of about 45 minutes, the melt is dissolved in about 70 grams of methylethylketone. There is added thereto a solution of about 8.6 grams of butane-1,4-diol and about 0.4 ml. of dimethyl cyclohexylamine in approximately another 70 grams of methylethylketone. The combined solutions are heated for about 20 minutes to about 80° C. and there are added about 150 grams of dimethyl formamide containing about 0.5 ml. of diisobutylamine and about 1.5 ml. of N-methylaniline.

For impregnating a woolen fleece, the above solution is diluted with methylethylketone to approximately 5 percent solid content. The woolen fleece is dipped, the excess solution is queezed out between rollers and the solvent is evaporated by heating in a heating chamber or on heated rollers.

Example 8

50 grams of a polyester (—OH number 56) produced from ethylene glycol and adipic acid are dehydrated in vacuo and reacted with 20 grams of 4,4-diphenyl methane diisocyanate at 130° C. (reaction period one hour). The melt containing —NCO groups is dissolved in 30 grams of methyl ethyl ketone and a solution of 4.5 grams of 1,4-butane diol and 0.2 cm.³ of dimethyl cyclohexyl amine in 25 grams of ethyl methyl ketone are added at 80° C. The reaction solution is kept for 35 minutes at 80° C. 50 grams of dimethyl formamide are then added and thereafter 0.75 cm.³ if diisobutyl amine in 6 grams of dimethyl formamide. The solution shows a viscosity of 275 poises at 30° C.

25 grams of the solution as obtained are diluted with 2 litres of a solvent mixture of 95% methyl ethyl ketone and 5% dimethyl formamide. Knitted stockings made of polycaprolactam which are dyed with the azo dyestuff of m-phenylene diamino-4-sulfonic acid and 4-nitro-2-aminophenol are dipped into this solution. The impregnated stockings are squeezed and dried. The stockings are then treated with overheated steam in the usual way to fix their form. The stockings thus treated have a good handle and strength of meshes.

Example 9

400 grams of the polyester described in Example 1 are dehydrated in vacuo and reacted with 160 grams of 4,4'-diphenyl methane diisocyanate at 130° C. for 60 minutes. The melt is cooled to 100° C. and dissolved in 200 grams dry methyl ethyl ketone. A solution of 36 grams of 1,4-butane diol and 1.6 cm.³ of dimethyl cyclohexyl amine in 150 grams of dry methyl ethyl ketone are then added and the combined solutions are reacted together for 20 minutes at 80° C. 410 grams of dimethyl formamide heated to 80° C. are then added, and thereafter another 30 grams of dimethyl formamide and 100 grams of methyl ethyl ketone, to which 5.5 cm.³ of diisobutyl amine have been added. The excess of monoamine is reacted after 10 minutes with 5.5 cm.³ of pyrocarbonic acid diethyl ester in 10 grams of dimethyl formamide. The 50% solution thus obtained shows a viscosity of 100 poises at room temperature.

100 grams of the solution thus obtained are diluted with 900 grams of methylene chloride. A fishing net knotted from polycaprolactam monofils is dipped into this solution. The net is then squeezed on a roller in such a way that the net has a 2% coating thereafter. The net thus treated shows a good resistance against slipping of the knots and an easy handle.

Example 10

100 grams of the 40% solution obtained as described in Example 9 are diluted with 900 grams of methylene chloride.

A multifil cable band (4500 denier) made of caprolactam is passed at a rate of 70 m./minute through this solution. The cable band is then passed through a vertical tunnel (4.5 m. long and with a diameter of 200 mm.). The tunnel is heated to 200° C. by means of hot air passing through the tunnel from below at a rate of 50 cm.³/hour.

The dried cable band can be made into nets with excellent resistance against slipping of the knots.

It is to be understood that any suitable organic polyisocyanate organic compound containing at least two active hydrogen containing groups as determined by the Zerewitinoff method, polyhydric alcohol, polyamine, monohydric monomeric alcohol, monoamine or catalyst which will cause the polymerization of —NCO groups, inert organic solvents and the like could have been used in the foregoing examples in accordance with the preceding disclosure with satisfactory results.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A coating composition obtained by
   (a) reacting an excess of an organic polyisocyanate with an organic compound having a molecular weight of at least about 500, said organic compound being capable of reacting with a polyisocyanate to form a polyurethane and having only terminal alcoholic hydroxyl groups as the sole reactive moiety, and thereby obtaining a prepolymer having free —NCO groups;
   (b) mixing and reacting said prepolymer substantially simultaneously with a member selected from the group consisting of butane diol and trimethylolpropane in an amount sufficient to react with some but insufficient to react with all the free —NCO groups of said prepolymer, conducting said reaction in the presence of a trimerization catalyst and an inert organic solvent selected from the group consisting of methyl ethyl ketone, diethyl ketone, methyl propyl ketone, dipropyl ketone, methyl isobutyl ketone, butyl acetate, dipropyl ether, dioxane, tetrahydrofuran, chlorobenzene and dichlorobenzene;
   (c) and effecting the reaction until the viscosity of the reaction mixture is about 10 to about 2000 poises at about 30° C. to obtain thereby a composition containing isocyanuric acid rings;
   (d) and subsequently adding to said composition a member selected from the group consisting of monomeric monohydric alcohols and monomeric primary monoamines to thereby react with the free —NCO groups present in the composition obtained in (c) above, conducting the reaction with said monohydric alcohols and said primary monoamines in a solvent selected from the group consisting of methyl ethyl ketone, diethyl ketone, methyl propyl ketone, dipropyl ketone, methyl isobutyl ketone, butyl acetate, dipropyl ether, dioxane, tetrahydrofuran, chlorobenzene, dichlorobenzene, dimethyl formamide, dimethyl acetamide and dimethyl sulfoxide until there are no further —NCO groups present.

2. The composition of claim 1 wherein the reaction of said prepolymer with the active hydrogen compound as defined in (b) is conducted at a temperature of from about 70° C. to about 130° C.

3. The composition of claim 1 wherein said organic compound has a molecular weight of from about 500 to about 3000.

4. The composition of claim 1 wherein said trimerization catalyst is used in an amount of from about 0.001% to about 5% by weight based on the weight of the reaction mixture.

5. A process for the preparation of a coating composition which comprises (a) reacting an excess of an organic polyisocyanate with an organic compound having a molecular weight of at least about 500, said organic compound capable of reacting with a polyisocyanate to form a polyurethane and having only terminal alcoholic hydroxyl groups as the sole reactive moiety, and thereby obtaining a prepolymer having free —NCO groups;

(b) mixing and reacting said prepolymer substantially simultaneously with a member selected from the group consisting of butane diol and trimethylolpropane in an amount sufficient to react with some but insufficient to react with all the free —NCO groups of said prepolymer, conducting said reaction in the presence of a trimerization catalyst and an inert organic solvent selected from the group consisting of methyl ethyl ketone, diethyl ketone, methyl propyl ketone, dipropyl ketone, methyl isobutyl ketone, butyl acetate, dipropyl ether, dioxane, tetrahydrofuran, chlorobenzene and dichlorobenzene;

(c) and effecting the reaction until the viscosity of the reaction mixture is about 10 to about 2000 poises at about 30° C. to obtain thereby a composition containing isocyanuric acid rings;

(d) and subsequently adding to said composition a member selected from the group consisting of monomeric monohydric alcohols and monomeric primary monoamines to thereby react with the free —NCO groups present in the composition obtained in (c) above, conducting the reaction with said monohydric alcohols and said primary monoamines in a solvent selected from the group consisting of methyl ethyl ketone, diethyl ketone, methyl propyl ketone, dipropyl ketone, methyl isobutyl ketone, butyl acetate, dipropyl ether, dioxane, tetrahydrofuran, chlorobenzene, dichlorobenzene, dimethyl formamide, dimethyl acetamide and dimethyl sulfoxide until there are no further —NCO groups present.

6. The process of claim 5 wherein the molecular weight of said organic compound is about 500 to about 3000, and wherein the prepolymer is reacted with said active hydrogen compound of (b) at a temperature of from about 70° C. to about 130° C.

References Cited in the file of this patent

UNITED STATES PATENTS

| | | |
|---|---|---|
| 2,858,296 | Stilmar | Oct. 28, 1958 |
| 2,900,368 | Stilmar | Aug. 18, 1959 |
| 2,915,496 | Swart et al. | Dec. 1, 1959 |
| 2,917,471 | Nelson | Dec. 15, 1959 |
| 2,917,486 | Nelson et al. | Dec. 15, 1959 |
| 2,929,794 | Simon et al. | Mar. 22, 1960 |

FOREIGN PATENTS

| | | |
|---|---|---|
| 733,624 | Great Britain | July 13, 1955 |
| 571,961 | Canada | Mar. 10, 1959 |
| 84,353 | Republic of South Africa | Feb. 1, 1954 |